United States Patent
Moliton et al.

(10) Patent No.: US 6,880,931 B2
(45) Date of Patent: Apr. 19, 2005

(54) OPHTHALMIC LENS HAVING A PROJECTION INSERT

(75) Inventors: Renaud Moliton, Paris (FR); Paul Zavracky, Norwood, MA (US)

(73) Assignees: Essilor International (FR); The Microoptical Corporation, Westwood, MA (US)

( * ) Notice: Subject to any disclaimer, the term of this patent is extended or adjusted under 35 U.S.C. 154(b) by 0 days.

(21) Appl. No.: 10/338,982

(22) Filed: Jan. 9, 2003

(65) Prior Publication Data

US 2003/0218718 A1 Nov. 27, 2003

(30) Foreign Application Priority Data

Jan. 11, 2002 (FR) .......................................... 02 00303

(51) Int. Cl.⁷ ................................................ G02C 7/02
(52) U.S. Cl. ........................................ 351/159; 359/630
(58) Field of Search ................................. 359/630, 631, 359/633, 638; 351/159, 160 R, 163, 165, 166

(56) References Cited

U.S. PATENT DOCUMENTS

| 4,977,029 A | * | 12/1990 | Brown et al. ............... 428/429 |
| 5,886,822 A | | 3/1999 | Spitzer |
| 6,124,997 A | | 9/2000 | Hirasaka |
| 6,204,974 B1 | | 3/2001 | Spitzer |
| 6,384,982 B1 | * | 5/2002 | Spitzer ........................ 359/630 |
| 6,611,385 B1 | * | 8/2003 | Song ........................... 359/630 |
| 2003/0210467 A1 | * | 11/2003 | Song ........................... 359/630 |

* cited by examiner

*Primary Examiner*—Scott J. Sugarman
*Assistant Examiner*—Darryl J. Collins
(74) *Attorney, Agent, or Firm*—Fish & Richardson P.C.

(57) ABSTRACT

An ophthalmic lens contains inserts (26, 28) for projecting an image towards the user's eye. The lens is treated by coating the surface order to attenuate light reflected on the treated surface from the inside of the lens. Coating the surface of the lens attenuates the parasitic images formed by rays reflected on the coated surface and projected by the insert.

12 Claims, 2 Drawing Sheets

FIG_1
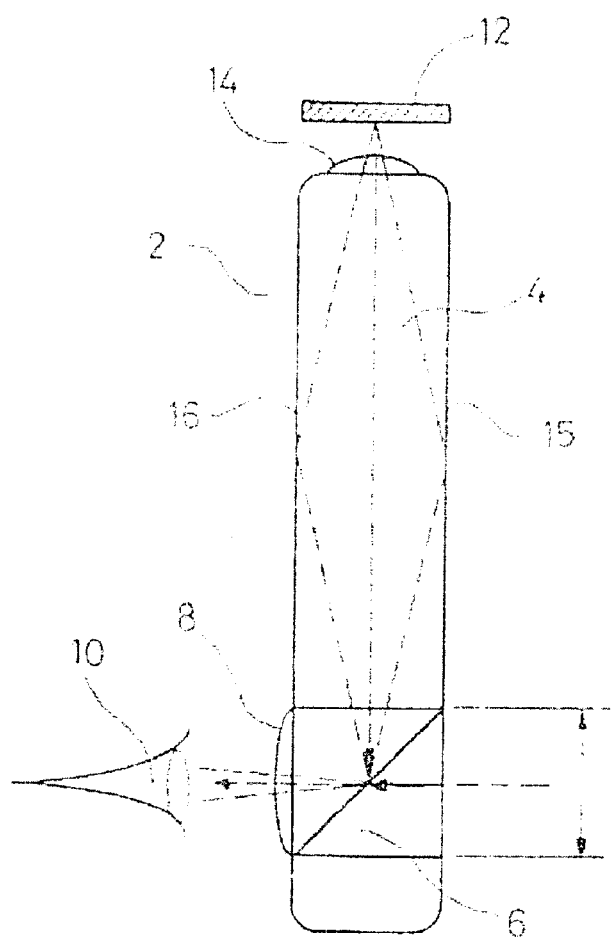
FIG_2
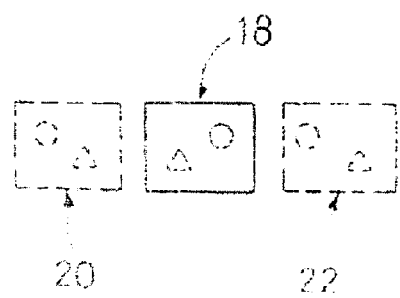

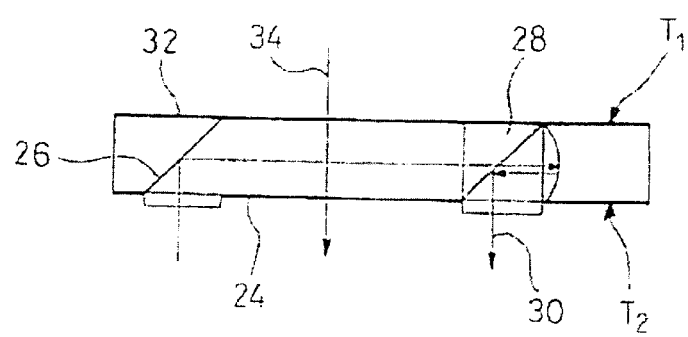
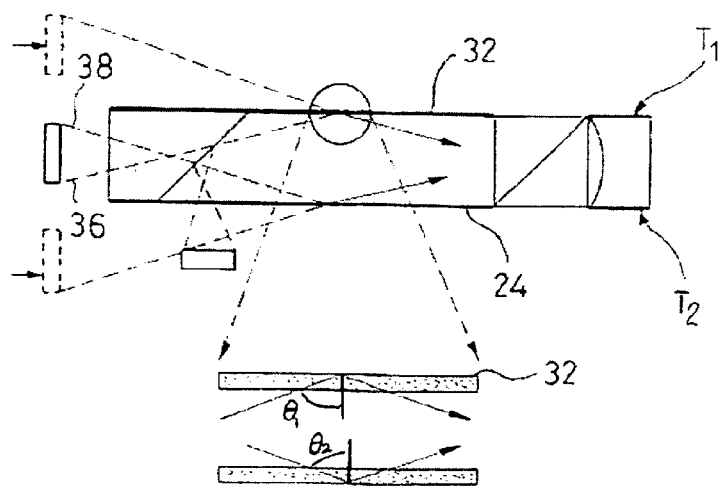

OPHTHALMIC LENS HAVING A PROJECTION INSERT

BACKGROUND OF THE INVENTION

The present invention relates to ophthalmic lenses having inserts for projecting an image towards the user, and more specifically, for attenuating parasitic images in such a lens.

U.S. Pat. Nos. 5,886,822 and 6,204,974 disclose image combination systems for eyeglasses or face masks; an image is projected towards the wearer's eye via an optical path made in the lens; in these patents, as in the present description, the optical system containing the inserts is called a "lens", which system may especially be intended to be mounted in an eyeglass frame or in a head-mounted display. In one embodiment, this optical path is defined by inserts mounted in the thickness of the lens; the inserts proposed in these patents comprise mirrors, semireflective plates, polarizing beam-splitter cubes, quarter-wave plates, lenses, mirrors, concave reflecting lenses (for example, a Mangin mirror), diffractive lenses and/or holographic components. It is proposed to mount these inserts in the lens in an injection moulding, or else to machine the insert and to assemble them with the other elements of the lens.

In the example of FIG. 4 of U.S. Pat. No. 5,886,822, the lens is formed by mounting a cube-shaped insert between two glass or plastic plates. A first polarizer is placed around the insert between the two glass plates; the insert is designed so as to transmit the polarization in the same direction as the first polarizer; a second polarizer is mounted so that it can rotate on a support in front of the glass plate away from the user's eye. This lens allows the user to see both the light projected through the insert and the light coming from the ambient scene, which passes around the insert and through the latter. This ambient light passes through both polarizers or the second polarizer and the insert. Rotation of the second polarizer allows the user to adjust the balance between the projected image and the ambient image. In the example of FIG. 8, it is proposed to use a liquid-crystal panel and a sensor in order to compensate or balance the relative brightnesses of the projected image and of the ambient image automatically. In this document (col. 11 line 51) it is also proposed to use photochromic materials in order to control the ambient light. No details are given concerning the use of such materials. Finally, this document also suggests masking the presence of inserts by polarizing, photochromic, tinted or reflecting films, as for sunglasses; these films are only used for aesthetic purposes.

The invention is based on the discovery of a problem relating to parasitic images in lenses having inserts. FIG. 1 shows, by way of example, a lens in which this problem appears. It shows an outline diagram of a lens of the type proposed in FIG. 7 of U.S. Pat. No. 5,886,822. The ophthalmic lens 2 is an optical system formed from a material 4, in which an insert 6 is placed; the insert 6 sends the light coming from a source 12 through a focusing lens 8 towards the user's eye 10; the light coming from the source 12 is injected into the thickness of the ophthalmic lens through a focusing lens 14 placed at the periphery of the ophthalmic lens. The light coming from the external environment passes through the insert 6 and the focusing lens 8 and also arrives at the user's eye. The latter can therefore see both the image coming from the source 12 and the external environment.

The image coming from the source is projected from the focusing lens towards the insert, and is transmitted through the insert towards the user's eye. However, it is possible for the light coming from the source to be reflected on the front wall 15 of the lens, thus forming a parasitic image, hereinafter called front image or front parasitic image. It is also possible for the light coming from the source to be reflected on the rear wall 16 of the lens thus forming another parasitic image, hereinafter called rear image or rear parasitic image. The dotted lines in FIG. 1 symbolize the propagation of the direct image, and of the images reflected on the front and rear walls of the lens.

FIG. 2 shows schematically the projected images, as seen by the user. The image 18 is the image projected directly from the focusing lens towards the insert; the images 20 and 22 are the parasitic images projected after respective reflections on the front and rear faces of the lens. These parasitic images may have a brightness close to that of the main image. Effectively, given the reflection angles proposed in the example, the reflection is a total internal reflection.

U.S. Pat. 6,124,977, discloses an image display apparatus using a modified prism as the optical system. Images to be displayed are applied to a first prism surface by a display device. They are reflected at a third surface of the prism and then on the second surface after passing through the third surface, to arrive at the user's eye. The second prism surface is provided with a reflective coating and in places, with a black absorbent coating. This apparatus does not comprise an insert that receives light propagating in a lens and redirects this light to the user's eye.

SUMMARY OF THE INVENTION

There is therefore a need for a lens having inserts in which the parasitic images are attenuated or removed.

The invention provides an ophthalmic lens having at least one insert for projection towards the user's eye adapted to receive light propagated through the lens, the lens having, over at least one surface, a coating attenuating the light reflected on the said surface from the inside of the lens.

According to one embodiment, the coating covers the surface of the lens away from the user.

According to another embodiment, the coating covers the surface of the lens directed towards the user.

According to another embodiment, the coating does not cover that part of the lens surface through which the light coming from the insert is projected towards the user.

According to yet another embodiment, the lens has a receiving insert suitable for receiving light coming from outside the lens in order to project it towards the projection insert.

Provision can also be made that the coating does not cover that part of the lens surface through which the light coming from outside the lens enters the lens.

According to one embodiment, the coating is a pigmented coating near the lens surface.

According to another embodiment, the pigmented coating is produced over a depth less than 50 $\mu$m from the surface.

According to another embodiment, the pigmented coating is produced over a depth of 10 to 50 $\mu$m from the surface.

According to another embodiment, the coating is an additional layer provided over the surface.

According to yet another embodiment, the additional layer is colored.

The invention also provides a method of decreasing the relative intensity of parasitic images in an ophthalmic lens having at least one insert for projection towards the user's eye adapted to receive light propagated through the lens, the method comprising the application over at least one surface of the lens of a coating attenuating the light reflected on the said surface from the inside of the lens.

According to one embodiment, the application is on the surface of the lens away from the user.

According to another embodiment, the application is over the surface of the lens directed towards the user.

According to another embodiment, the application is not on that part of the lens surface through which the light coming from the insert is projected towards the user.

According to yet another embodiment, before the application step, the method comprises a step of masking that part of the lens surface through which the light coming from the insert is projected towards the user.

Provision can also be made that after the application step, the method comprises a step of unmasking that part of the lens surface through which the light coming from the insert is projected towards the user.

According to one embodiment, the lens has a receiving insert adapted to receive light coming from outside the lens in order to project it towards the projection insert and that the application is not on that part of the lens surface through which the light coming from outside the lens enters the lens.

According to another embodiment, before the application step, the method comprises a step of masking that part of the lens surface through which the light coming from outside the lens enters the lens.

According to another embodiment, after the application step, the method comprises a step of unmasking that part of the lens surface through which the light coming from outside the lens enters the lens.

According to yet another embodiment, the coating is a pigmented coating near the lens surface.

Provision can also be made that the pigmented coating is produced over a depth less than 50 $\mu$m from the surface.

According to one embodiment, the pigmented coating is produced over a depth of 10 to 50 $\mu$m from the surface.

According to another embodiment, the pigmented coating is produced by immersing the lens in a pigment solution.

According to another embodiment, the step of applying the coating includes applying an additional layer.

According to yet another embodiment, the additional layer is colored.

Provision can also be made that the surface coating is applied to one surface of the insert, and that the method also comprises the step of mounting the insert on the lens.

According to one embodiment, the method also comprises a subsequent step of masking the surfaces of the coated insert, the surface coating then being applied to the lens.

Other characteristics and advantages of the invention will become apparent on reading the following detailed description of the embodiments of the invention, given solely by way of example and with reference to the drawings.

BRIEF DESCRIPTION OF THE DRAWINGS

FIG. 1 is an outline diagram of a lens of the prior art having inserts;

FIG. 2 is an outline diagram of the projected image and of the parasitic images in the lens of FIG. 1;

FIG. 3 is a sectional view of a first embodiment of the invention;

FIG. 4 is a view similar to that of FIG. 3, showing the path of the light generating the parasitic images;

FIG. 5 is a larger-scale view of part of FIG. 3, showing the reflection at the lens surfaces.

DETAILED DESCRIPTION OF PREFERRED EMBODIMENTS

The invention makes it possible to provide a solution to the problem of parasitic images, in a lens having inserts. It is of course applicable to other types of lenses than those proposed by way of example in FIG. 1. Thus, it is especially applicable to any lens having inserts and in which the light incident on the insert is propagated within the thickness of the lens. An example is given in FIG. 8 of U.S. Pat. No. 5,886,822, in which the source is placed on the same side of the lens as the user's eye and in which the image is injected into the lens by means of an insert of the same type as the insert 6. More generally, the invention finds an application whenever light projected towards a user is reflected at a lens surfaces before reaching an insert that projects the image towards the user.

To reduce the brightness of the parasitic images, the invention proposes providing an absorbing or attenuating coating on at least one surface of the lens. This coating has the effect of attenuating the light rays reflected at the lens surfaces, from the inside of the lens. The rays forming the parasitic images by reflection on the surface or surfaces of the lens are therefore attenuated with respect to the rays forming the main image; this is because the latter propagate within the lens, rather than close to its surfaces.

FIG. 3 is a sectional view of a first embodiment of the invention. In this embodiment, the source of the projected image is on the same side of the lens as the user's eye. The light projected by the source enters while passing through the rear surface 24 of the lens into a first insert 26. It is reflected therein along a propagation direction parallel to the plane of the lens, towards a second insert 28. The second insert receives the light coming from the first insert, and transmits it towards the user's eye. In the figure, reference numeral 30 indicates the path of a light ray coming from the source. Moreover, the ambient light passes through the front surface 32 of the lens, the rear surface of the lens and arrives at the user's eye. Reference numeral 34 in the figure indicates the path of a ray of the ambient light.

FIG. 3 also shows, in bold in the figure, that the front surface of the lens is coated on the surface. The coating has the effect of absorbing part of the light passing through it, and is applied to the lens surface, or over a small thickness within the material; the term "small thickness" is here understood to mean distances of the order of a few micrometres, preferably less than 50 $\mu$m, for example between 10 and 50 $\mu$m.

In the example of FIG. 3, the rear surface of the lens is also coated, except for the surfaces of the insert or the surfaces through which the projected light passes. In the simplest configuration, the attenuation on the front face and on the rear face are identical. This allows the same attenuation of the parasitic images obtained by reflection on the front and rear surfaces; obviously, it could be otherwise, especially if one of the parasitic images is less problematic because of the lens construction or the focusing of the source.

Examples of suitable surface coatings are given in the remainder of the description.

The lens of FIG. 3 functions as follows. As is shown in the figure by the ray 30, the light coming from the source enters the first insert without passing through the coated part of the rear surface; it emerges from the lens through the second insert, still without having passed through the coated surface. The coating of the front surface or of the rear surface, or indeed of both, has no effect on the projected light which forms the main image.

The ambient light 34 passing through the lens around the inserts is attenuated since it passes through the front surface of the glass, and that part of the rear surface which is coated.

FIG. 4 is identical to FIG. 3, but it shows the rays reflected on the front and rear surfaces of the lens. As is shown by the ray referenced 36, the light coming from the source forms a parasitic image after reflection on the front surface 32. It is therefore subject to attenuation which is dependent on the absorption caused by the surface coating. In the same way, the ray 38 forms a parasitic image after reflection on the rear surface 24, in the coated part. The parasitic image formed after reflection on the rear surface is therefore also attenuated. In this figure, for the sake of clarity, the optical path corresponding to the path in the insert 26 has been unfolded and the position of the source is therefore altered.

FIG. 5 is a larger-scale view of part of FIG. 4, showing the reflection of the rays coming from the projection source on the front and rear surfaces of the lens; the figure shows the example of an absorbent coating applied over a small thickness on each surface of the lens. The transmission coefficients of light at normal incidence on the front surface of the lens and on the rear surface of the lens are called $T_1$ and $T_2$ respectively. The angle of incidence of the light forming the front image and the rear image are called $\theta_1$ and $\theta_2$ respectively. Because of the lens configuration, these angles of incidence are usually greater than 60°, and often close to 90°. It is known for an absorbent coating with a given absorption coefficient per unit length that the absorption is an exponential function of the product of the absorption per unit length times the distance travelled within the material. Compared with light at normal incidence, a ray propagating in the lens and reflecting at the lens surface with an angle of incidence $\theta_1$ passes twice through the absorbent layer, while travelling a distance which is the ratio of the thickness of the absorbing layer to the cosine of the angle of incidence $\theta_1$. The absorption undergone by such a ray can therefore be written $$T = T_1 \frac{2}{\cos\theta_1}$$

In the same way, a ray reflected on the rear surface of the lens undergoes absorption $$T = T_2 \frac{2}{\cos\theta_2}$$

It is therefore possible, especially because of the high angle of incidence of the light, for the light forming the parasitic images to be highly attenuated, without however penalizing the transmission of the ambient light through the lens. The example of FIGS. 3 to 5 thus makes it possible to limit the problem caused by parasitic images.

The lens in the drawings thus makes it possible to attenuate parasitic images while allowing the lens to transmit ambient images. The lens can always transmit images or allow objects to be viewed by transmission.

In the example of FIGS. 3 to 5, the coating is applied to the rear surface of the lens, except for the point where the light from the projected image passes through. It is also possible to apply the coating to the point where the light from the projected image passes through, or only on one of the inserts. The table below gives the transmission values for the main image, the front image, the rear image and the ambient light, for various types of coating application. In the example, just the absorption proposed above has to be calculated. Obviously, the attenuations are derived from the proposed transmission values.

TABLE 1

| | Projected image | Front image | Rear image | Transmitted ambient light |
|---|---|---|---|---|
| Example 1 | 1 | $T = T_1^{\frac{2}{\cos\theta_1}}$ | $T = T_2^{\frac{2}{\cos\theta_2}}$ | $T_1 \cdot T_2$ |
| Example 2 | 1 | 1 | $T = T_2^{\frac{2}{\cos\theta_2}}$ | $T_2$ |
| Example 3 | 1 | $T = T_1^{\frac{2}{\cos\theta_1}}$ | 1 | $T_1$ |
| Example 4 | $T_2$ | $T = T_2^2 \cdot T_1^{\frac{2}{\cos\theta_1}}$ | $T = T_2^{1+\frac{2}{\cos\theta_2}}$ | $T_1 \cdot T_2$ |
| Example 5 | $T_2^2$ | $T = T_2^2 \cdot T_1^{\frac{2}{\cos\theta_1}}$ | $T = T_2^{2+\frac{2}{\cos\theta_2}}$ | $T_1 \cdot T_2$ |
| Example 6 | $T_2$ | $T_2$ | $T = T_2^{1+\frac{2}{\cos\theta_2}}$ | $T_2$ |
| Example 7 | $T_2^2$ | $T_2^2$ | $T = T_2^{2+\frac{2}{\cos\theta_2}}$ | $T_2$ |
| Example 8 | $T_2$ | $T_2$ | $T = T_2^{1+\frac{2}{\cos\theta_2}}$ | $T_2$ |

TABLE 1-continued

| | Projected image | Front image | Rear image | Transmitted ambient light |
|---|---|---|---|---|
| Example 9 | $T_2$ | $T = T_2 \cdot T_1^{\frac{2}{\cos\theta_1}}$ | $T = T_2^{1+\frac{2}{\cos\theta_2}}$ | $T_1 \cdot T_2$ |

Example 1 is that of FIG. 3. Example 2 is identical to that of FIG. 3, but without a coating on the front surface. Example 3 is identical to that of FIG. 3, but without a coating on the rear surface. Example 4 is identical to that of FIG. 3, but with a coating on the first insert. Example 5 is identical to that of FIG. 3, but with a coating on both inserts. Example 6 has a coating on the rear surface, except on the second insert, but no coating on the front surface. Example 7 has a coating over the entire rear surface, with no coating on the front surface. Example 8 has a coating on the rear surface, except on the first insert, with no coating on the front surface. Example 9 has a coating on the rear surface, except on the first insert, and a coating on the front surface. This last example is particularly advantageous for lenses also making it possible for users to see the ambient scene through the inserts; in this case, an ambient image is obtained which has the same attenuation at every point.

These examples show that it is possible to choose, depending on the circumstances and on the shape of the lens, the attenuation applied to the front image, to the rear image or to the ambient image, with respect to the attenuation applied to the projected image. Of course, other coatings could be applied and the transmission could be calculated differently, depending on the type of coating; it would still be equally possible to modify the relative attenuations of the various images.

In the preceding example, the lens is a lens of the "see-through" type in which the ambient image is formed around the inserts. It is also possible to apply an absorbent coating to "see-around" lenses in which the ambient image is formed through the inserts.

In the example, the penetration of the pigment beyond the penetration region in question has been ignored; this penetration may lead to attenuation of the main image. However, this attenuation remains low compared with the attenuation of the parasitic images during reflection. Furthermore, this attenuation is in fact applicable to all the images formed through the lens. It is therefore legitimate to ignore it. In any case, the value of this attenuation can be predicted: this is because the way in which the absorption density varies according to the penetration depth is known and optical modelling of the system makes it possible to deduce therefrom the loss of flux in the projected image. The transmission coefficient of the inserts has also been ignored. Again, the same reasoning is applicable; the only effect would be to change the brightness of the projected image compared with the ambient image. This brightness is in any case adjusted by other means—source intensity, etc.

Examples of surface coating, which may make it possible to attenuate the light reflected on the surface from the inside of the lens, will now be given.

With regard to organic glasses, the pigments may be of ionic type and may be chosen according to the chemical structure of the polymer matrix. By way of example, pigments supplied by BPI ("Brain Power Incorporated"), of Miami, Fla., were used, for a polymer matrix of the type indicated below. The coloring can be achieved by dipping into a dye solution at a given temperature T for a given time t. The penetration depth d mainly depends on the type of pigment. The penetration depth may also depend on the dipping time, and on the material forming the lens. The advantage of such a method of forming the surface coating is also that it easily allows the inserts or any other part of the lens to be masked.

EXAMPLE 1

The pigment was applied to an organic lens obtained by polymerization of diethylene glycol diallyl carbonate: a first pigment was the black pigment sold under the reference "black BPI". The solution was at a temperature T of 92° C. and the immersion lasted from 1 to 3 min. The penetration depth of the pigment was about 10 µm. Another trial with the red pigment sold under the reference "red BPI", for the same solution temperature and the same immersion time lead to a penetration depth of 50 µm. In this example, it was noticed that, for the same material, under the same temperature conditions, the pigment penetration depth d mainly depended on the choice of pigments.

EXAMPLE 2

The pigment was applied to an organic lens based on the dimethacrylate of tetra(ethoxy)-bisphenol A; the two pigments mentioned above were applied with an immersion time of 1 to 3 min. The penetration depths were identical.

EXAMPLE 3

The pigment was applied to a polythiourethane-based lens of refractive index 1.6. The pigment used was that sold under the reference "black BPI". The immersion temperature T was about 92° C. and the immersion lasted for about 2 h giving a penetration depth of about 10 µm. In general, a pigment having as small a penetration depth as possible was favoured so as to minimize the risk of attenuating the projected image.

According to another embodiment, the absorbent coating provided at the lens surface may be produced by applying an additional layer, capable of being colored, over this surface. A thin layer of varnish containing absorbent pigment may, for example, be deposited on the lens surface.

It was then necessary, in order to choose the material of the additional layer, to take into account the refractive index of the lens material. The refractive index values of either lens are preferably close, and ideally equal.

Such a coating is equally suitable for lenses made of an organic material as for lenses made of inorganic material.

The following tables provide the experimental measurements of the attenuation of the parasitic images, carried out on a lens having the configuration of FIG. 3, and on a lens having a similar configuration, but without a coating on the surfaces. The coating used in the example is a coating of the "black BPI" type. The measurements were carried out using an imaging photometer, on several images, while carrying out several readings for each image. Table 2 gives the results for a lens not having been subject to a coating, and table 3 gives the results for a lens of the type of FIG. 3.

TABLE 2

| Untinted lens | 1st reading | 2nd reading | Mean of measurements | Intensity ratio |
|---|---|---|---|---|
| "Left" parasitic image | 3296 1018 1169 | 4655 1541 1253 | 2155.52 | 66% |
| Main image | 3296 3784 2870 | 3076 4055 2500 | 3263.35 | 100% |
| "Right" parasitic image | 2870 3076 1770 | 2333 2679 2177 | 2484.21 | 76% |

TABLE 3

| Tinted lens | 1st reading | 2nd reading | Mean of measurements | Intensity ratio |
|---|---|---|---|---|
| "Left" parasitic image | 256 181 208 | 294 239 239 | 236.02 | 10% |
| Main image | 1541 3531 1652 | 1770 2870 2333 | 2282.99 | 100% |
| "Right" parasitic image | 181 158 147 | 169 208 181 | 174.02 | 8% |

| | Difference between ratios: (untinted)-(tinted) | Intensity ratio (tinted)/(untinted) |
|---|---|---|
| "Left" parasitic image | 56% | 11% |
| Main image | 0% | 70% |
| "Right" parasitic image | 68% | 7% |

Comparing the results of both tables shows that the intensity of the parasitic image changed from 60 to 70% of the main image to about 10% of the main image. It was also noted that the intensity of the main image was also reduced by about 30% in table 3 compared with the measurement of table 2; as indicated above, this may be caused by the pigment penetrating too far beyond the surface. Of course, the present invention is not limited to the embodiments described by way of example; thus, provision may be made for inserts other than those of the examples. The inserts may especially comprise mirrored prisms, polarization-splitting semitransparent cubes, quarter-wave plates or Mangin mirrors. These inserts may be formed by depositing thin layers forming optical coatings on inorganic or organic elements. Mention may especially be made of diffractive lenses or holographic components.

In the example of the figures, the inserts are moulded in the lens in order to form a one-piece assembly; it is also possible to apply a surface coating to assembled lenses and not to moulded lenses.

According to one embodiment, it is possible to apply a prior surface coating to the inserts. This coating is, for example, applied to the surfaces of the inserts which must then be placed in alignment with the coated surfaces of the lens. The method may then comprise the following steps: a precoated insert is mounted on the lens, then the surfaces 24 and 32 are coated possibly by masking the various surfaces of the inserts.

Other masking techniques could also be used to ensure that the coating does not cover the inserts.

What is claimed is:

1. An ophthalmic lens having
   at least one insert for projection towards the user's eye, the insert being adapted to receive light propagated through the lens; and
   a coating over at least part of at least one surface positioned to internally reflect light propagated through the lens to the insert, the coating attenuating said internally reflected light to reduce parasitic images.

2. The lens of claim 1, wherein said surface is a surface of the lens away from the user.

3. The lens of claim 1, wherein said surface is a surface of the lens directed towards the user.

4. The lens of claim 1, wherein the coating covers two surfaces of the lens.

5. The lens of claim 1, wherein the coating does not cover a part of the lens surface through which light is projected from the insert towards the user.

6. The lens of claim 1, wherein further comprising a receiving insert adapted for receiving light coming from outside the lens and for projecting the received light towards the projection insert.

7. The lens of claim 6, wherein the coating does not cover a part of the lens surface through which the light coming from outside the lens enters the lens.

8. The lens of claim 1, wherein the coating comprises a pigmented coating near the lens surface.

9. The lens of claim 8, wherein the pigmented coating is produced over a depth less than 50 $\mu$m from the surface.

10. The lens of claim 8, wherein the pigmented coating is produced over a depth of 10 to 50 $\mu$m from the surface.

11. The lens of claim 1, wherein the coating comprises an additional layer provided over a surface of the lens.

12. The lens of claim 11, wherein the additional layer is colored.

* * * * *